United States Patent [19]
Hawman

[11] Patent Number: 5,430,297
[45] Date of Patent: Jul. 4, 1995

[54] FAN-BEAM COLLIMATOR WITH OFFSET FOCUS AND SCINTILLATION CAMERA SYSTEM WHICH USES IT

[75] Inventor: Eric G. Hawman, Schaumburg, Ill.

[73] Assignee: Siemens Medical Systems, Inc., Iselin, N.J.

[21] Appl. No.: 152,530

[22] Filed: Nov. 16, 1993

[51] Int. Cl.⁶ .................................................. G01T 1/164
[52] U.S. Cl. ................................. 250/363.1; 250/505.1
[58] Field of Search ..................... 250/363.10, 505.1; 378/149

[56] References Cited

U.S. PATENT DOCUMENTS

| | | | |
|---|---|---|---|
| 4,670,657 | 6/1987 | Hawman et al. | 250/363.10 |
| 5,001,347 | 3/1991 | Hsieh | 250/363.10 |

FOREIGN PATENT DOCUMENTS

| | | | |
|---|---|---|---|
| 465952A3 | 1/1992 | European Pat. Off. | |
| 079939 | 3/1992 | Japan | 250/363.1 |

Primary Examiner—Carolyn E. Fields
Attorney, Agent, or Firm—Mark H. Jay

[57] ABSTRACT

The focus of a fan beam collimator is offset from the centerline.

9 Claims, 3 Drawing Sheets

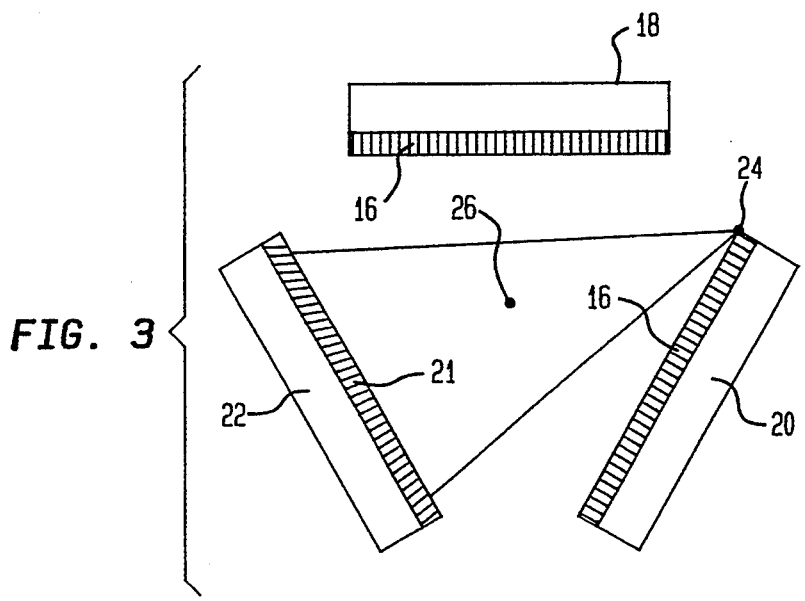
FIG. 3
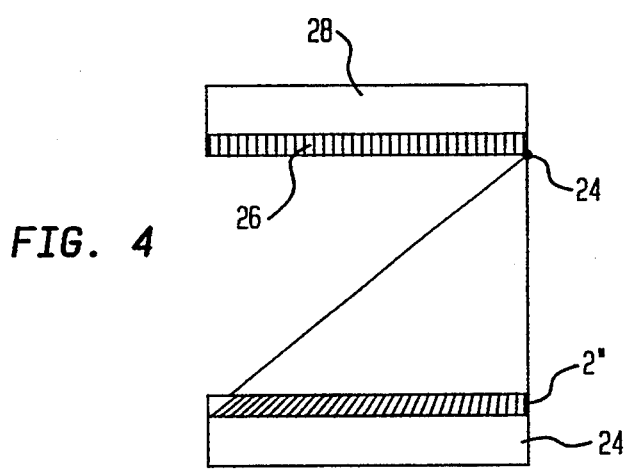
FIG. 4
FIG. 5
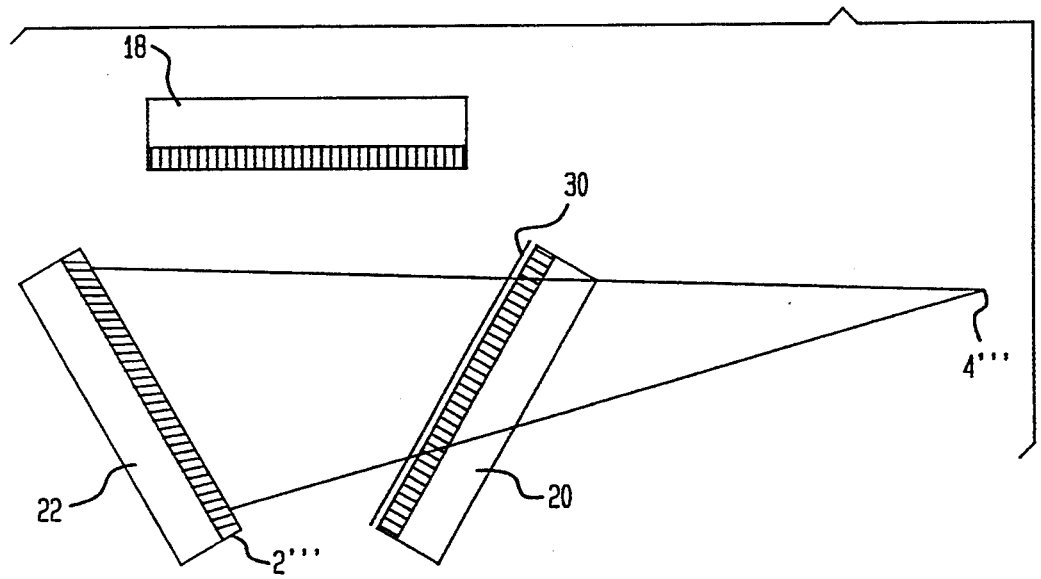

FAN-BEAM COLLIMATOR WITH OFFSET FOCUS AND SCINTILLATION CAMERA SYSTEM WHICH USES IT

BACKGROUND OF THE INVENTION

The invention relates to nuclear medicine, and more particularly relates to nuclear medicine SPECT studies. In its most immediate sense, the invention relates to attenuation correction techniques for use in nuclear medicine SPECT studies in which fan beam collimators are employed.

In a conventional SPECT (Single Photon Emission Computed Tomography) study of e.g. the heart, a radioisotope (TC-99m, Tl-201, for example) is administered to the patient and the radioisotope is taken up by the heart muscles. Then, the patient is placed in a scintillation camera system and one or more scintillation camera detectors are rotated about the long axis of the patient. These detectors pick up gamma radiation which leaves the patient, and the resulting data is used to form three-dimensional images ("SPECT images" or "tomographic images") of the distribution of the radioisotope within the patient.

Such three-dimensional SPECT images can be calculated based on a set of two-dimensional images ("projections" or "projection images") acquired by the scintillation camera system; this calculation process is known as image reconstruction. The most commonly employed method of image reconstruction is known as "filtered backprojection". When filtered backprojection reconstruction is used to reconstruct SPECT images from scintigraphic projection images obtained from a scintillation camera, some well-known distortions introduce errors ("artifacts") in the result. One of the most important distortions is caused by attenuation of gamma radiation in tissue.

As a consequence of attenuation, image values in the various projections do not represent line integrals of the radioisotope distribution within the body. It is therefore necessary to correct for this, and the process for doing so in SPECT is known as attenuation correction.

Many techniques for attenuation correction in SPECT assume that the linear attenuation coefficient of the body is uniform and impose such uniformity as a mathematical constraint in the image reconstruction process. However, for a very important class of studies, namely cardiac SPECT studies, the linear attenuation coefficient of the body is in fact highly nonuniform. This is because lung tissue has a lower attenuation than do, e.g., the blood and other non-lung tissue.

Thus, in SPECT studies of, e.g., the heart, a SPECT reconstruction of the image of radioactivity within the heart will necessarily contain artifacts caused by the unequal attenuation coefficients of, e.g., the lungs and the body (and, in the case of some female patients, large breast size.)

It is known to measure the actual attenuation coefficients of body tissues by placing a source of gamma radiation on one side of the body and measuring the transmission of the gamma radiation through the body as a function of direction, i.e. collecting transmission CT data. When a fan beam collimator is used to carry out a cardiac SPECT study, it has been the practice to place a line source at the focus of the collimator. This insures proper registration between the CT data and the SPECT data and permits collection of the transmission CT data simultaneously with the SPECT data.

This practice has an undesirable consequence because of the nature of conventional fan beam collimators. Conventional fan beam collimators have the focal point located on the centerline of the collimator. Because of dimensional constraints imposed by the geometry of the camera gantry, use of a fan beam collimator and conventional filtered backprojection techniques causes truncation artifacts to be produced where the imaged region has a diameter of about 20 cm or more. Thus, where a cardiac SPECT study is to be carried out on a large or obese patient, the clinician cannot obtain the magnification advantages afforded by a fan beam collimator without also obtaining truncation artifacts in the reconstructed image.

It would therefore be advantageous to provide apparatus which would provide the magnification advantages of fan beam collimators on larger patients.

One object of the invention is to provide a fan beam collimator which can be used to image larger patients without having truncation artifacts in the reconstructed images.

Another object is, in general, to improve on known collimators and scintillation camera apparatus.

In accordance with the invention, the focus of a fan beam collimator is located elsewhere than on the centerline of the collimator. As a result, when such a collimator is used in a scintillation camera system, cardiac SPECT studies can be carried out on larger patients without truncation artifacts in the reconstructed image.

BRIEF DESCRIPTION OF THE DRAWINGS

The invention will be better understood with reference to the following illustrative and non-limiting drawings, in which:

FIG. 3 shows a triple head scintillation camera system in accordance with a preferred embodiment of the invention;

FIG. 4 shows a dual head scintillation camera system in accordance with a preferred embodiment of the invention;

FIG. 5 shows a triple head scintillation camera system in accordance with another preferred embodiment of the invention.

DETAILED DESCRIPTION OF PREFERRED EMBODIMENTS

Figure 1:
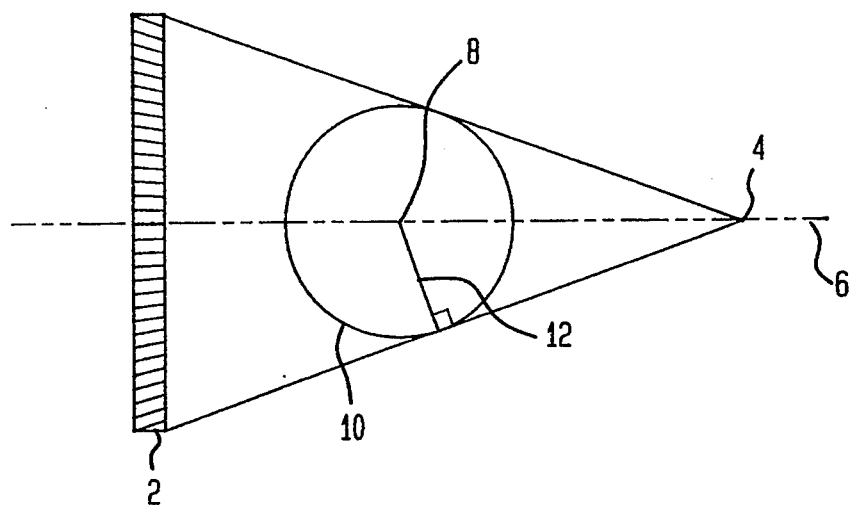
FIG. 1 schematically shows the geometry of a conventional fan beam collimator.
Figure 2:
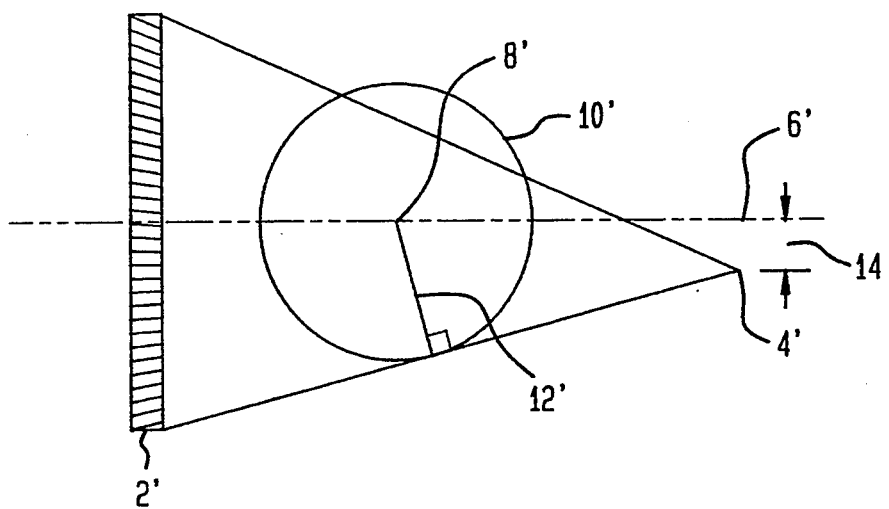
FIG. 2 schematically shows a fan beam collimator in accordance with a preferred embodiment of the invention.

In the drawings, the same element is always indicated using the same reference number.

Figure 6:
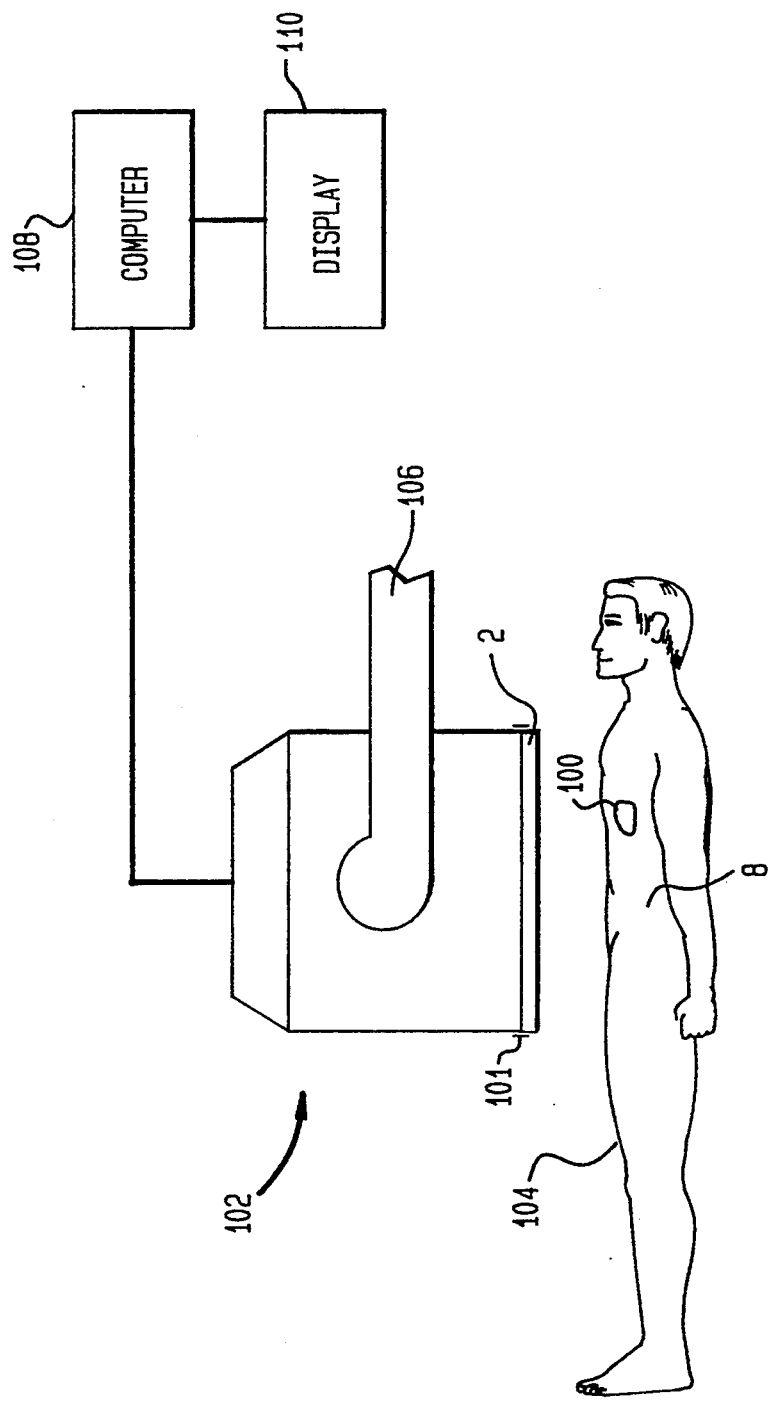
FIG. 6 schematically illustrates a conventional scintillation camera system in which the present invention may be utilized.

In a conventional fan beam collimator 2 such as is schematically illustrated in FIG. 1, the collimator 2 has a focus 4. The focus 4 is a line that intersects the centerline 6 of the collimator 2. To conduct a SPECT study of e.g. a patient's heart (100) (see FIG. 6), the collimator 2 is secured in a detachable manner using the means 101 to a detector head 102 which is rotated around the patient 104 by a gantry structure shown schematically at 106, the rotation being conducted about a center of rotation 8. Two other collimated detector heads are also used to collect information, but these have been omitted from FIG. 6 in the interest of clarity. Information produced by the detector head 102 and the other detector heads (not shown) is input to a computer 108, which reconstructs nuclear medicine images for display on a display 110.

It is known that to avoid truncation artifacts in the reconstructed image, the imaged slice of the patient's body must be completely encompassed by the field of view of the collimator. Thus, in a conventional fan beam collimator 2 such as is illustrated in FIG. 1, the imaged slice of the patient's body must fit within the circle 10 which is centered upon the center of rotation 8 and which has a radius 12 which is normal to each of the extreme edges 14 and 16 of the field of view of the collimator 2.

In e.g. a conventional scintillation camera system such as is marketed by Siemens Medical Systems, Inc. under the MULTISPECT 3 trademark, the focal length (the distance between the collimator 2 and the focus 4) is about 60 cm. Such a constraint requires that the circle 10 in a conventional fan beam collimator 2 be about 20 cm in diameter. The thorax of a typical patient is too large to fit into a 20 cm diameter circle, so cardiac SPECT studies cannot be carried out on most patients using a fan beam collimator without incurring image distortions caused by truncated projection data, or without requiring the use of iterative reconstruction methods to reduce such distortions.

In accordance with the invention, the focus 4' of a fan beam collimator 2' is located elsewhere than along the centerline 6'. However, the center of rotation 8' remains located on the centerline 6'. In accordance with the invention, and assuming that the collimator 2' is rotated 360° around the patient, a complete set of projection data can be acquired within the circle 10' (which has a radius 12' equal to the distance between the center of rotation 8' and the most remote edge of the field of view of the collimator 2'). Circle 10' is substantially larger than is the circle 10; in the above-mentioned MULTISPECT 3 system, and with an offset 14 of 17 cm, the circle 10' is 37 cm in diameter for a collimator focal length (distance between the fan beam collimator 2' and the focus 4') of 49 cm. Such a diameter is large enough to encompass the great majority of patients.

FIG. 3 shows how a fan beam collimator 2' in accordance with the invention can be used in a conventional triple-head camera system such as the above-mentioned MULTISPECT 3. In this example, conventional parallel hole collimators 16 are attached to heads 18 and 20 of the camera system, and the fan beam collimator 2' is attached to head 22. A line source 24 of gamma radiation is mounted to the edge of the head 20, and all three heads 18, 20 and 22 are rotated around the center of rotation 26 while a study is conducted. Transmission CT data regarding the transmission of radiation from the line source 24 through the body of the patient (not shown) can be used to determine the actual attenuation coefficients of the patient's body structures and to thereby produce SPECT images containing less truncation artifacts.

In the example of FIG. 4, a fan beam. collimator 2'' in accordance with the invention is attached to a head 24 of a dual head scintillation camera system such as that marketed by Siemens Medical Systems, Inc. under the MULTISPECT 2 trademark. Another collimator 26 is attached to the other head 28 of the camera system; the collimator 26 is shown as a parallel hole collimator but could alternatively be a focussing collimator. A line source 24 is fixed to the head 28 so that CT transmission data can be acquired to calculate the actual attenuation coefficients of the patient's body structures.

In the FIG. 5 example, another fan beam collimator 2''' in accordance with the invention has a highly offset focus 4''' located behind the head 20 of a triple head scintillation camera system (such as the Siemens Medical Systems, Inc. MULTISPECT 3 system). In this example, a line source 30 is attached to the head 20 in front of the collimator 32 attached thereto and is moveable axially (into and out of the plane of FIG. 5). This permits collection of a complete set of CT transmission data; motion of the source 30 is necessary since the source 30 is not coincident with the focus 4'''.

While this FIG. 5 embodiment is not presently preferred because of the mechanical structure which would be required to move the source 30, this FIG. 5 embodiment has the advantage that the heads may be moved radially during a study.

In use, a fan beam collimator in accordance with the invention is used and a study is conducted. The data thereby acquired are rebinned (i.e. are transformed into data such as would be produced by a conventional parallel hole collimator) and then input to conventional parallel hole reconstruction algorithms.

Although a preferred embodiment has been described above, the scope of the invention is limited only by the following claims.

I claim:

1. A fan beam collimator having a focus which is located elsewhere than the centerline of the collimator.

2. A scintillation camera system, comprising:
   a plurality of gamma radiation detectors;
   a gantry supporting said plurality of gamma radiation detectors for rotation about a patient;
   a fan beam collimator having a focus which is located elsewhere than the centerline of the collimator; and
   means for detachably securing said fan beam collimator to a one of said plurality of gamma radiation detectors.

3. The system of claim 2, further comprising means, connected to said plurality of gamma radiation detectors, for reconstructing nuclear medicine images.

4. A scintillation camera system, comprising:
   a plurality of gamma radiation detectors;
   a gantry supporting said plurality of gamma radiation detectors for rotation about a patient;
   a fan beam collimator having a focus which is located elsewhere than the centerline of the collimator;
   means for detachably securing said fan beam collimator to a one of said plurality of gamma radiation detectors; and
   a line source of gamma radiation.

5. The system of claim 4, wherein there are two gamma radiation detectors, wherein the gamma radiation detectors are diametrically opposed, wherein said detachably securing means is secured to a one of said gamma radiation detectors and wherein said line source of gamma radiation is secured to another one of said gamma radiation detectors, whereby said line source is located at said focus when said fan beam collimator is secured to said one of said gamma radiation detectors.

6. The system of claim 4, wherein there are three gamma radiation detectors, wherein said detachably securing means is secured to a one of said gamma radiation detectors and wherein said line source of gamma radiation is secured to another one of said gamma radiation detectors, whereby said line source is located at said focus when said fan beam collimator is secured to said one of said gamma radiation detectors.

7. The system of claim 4, wherein there are at least two gamma radiation detectors, wherein said detachably securing means is secured to a one of said gamma radiation detectors, wherein said line source of gamma radiation is secured to another one of said gamma radiation detectors, and wherein said line source is located elsewhere than said focus when said fan beam collimator is secured to said one of said gamma radiation detectors and is moveably secured to said another one of said gamma radiation detectors.

8. The system of claim 4, wherein said line source is fixed in position.

9. The system of claim 4, wherein said line source is moveable.

* * * * *